(12) United States Patent
Paczkowski et al.

(10) Patent No.: US 9,564,148 B2
(45) Date of Patent: Feb. 7, 2017

(54) ISOLATION AND MODIFICATION OF AUDIO STREAMS OF A MIXED SIGNAL IN A WIRELESS COMMUNICATION DEVICE

(75) Inventors: Lyle Walter Paczkowski, Mission Hills, KS (US); Farni B. Weaver, Spring Hill, KS (US); Talat Jamshidi, Leawood, KS (US); Nicolas A. Nehme Antoun, Olathe, KS (US); Wen Xue, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 833 days.

(21) Appl. No.: 12/782,472

(22) Filed: May 18, 2010

(65) Prior Publication Data

US 2011/0289410 A1    Nov. 24, 2011

(51) Int. Cl.
G06F 17/00    (2006.01)
G10L 21/06    (2013.01)
G11B 27/034   (2006.01)
G11B 27/34    (2006.01)

(52) U.S. Cl.
CPC .............. *G10L 21/06* (2013.01); *G11B 27/034* (2013.01); *G11B 27/34* (2013.01)

(58) Field of Classification Search
USPC ........................................................ 715/716
See application file for complete search history.

(56) References Cited

U.S. PATENT DOCUMENTS 5,259,035 A      11/1993  Peters et al.
5,539,741 A  *    7/1996  Barraclough et al. ........ 370/267
(Continued)

FOREIGN PATENT DOCUMENTS

EP          1780710        5/2007

OTHER PUBLICATIONS

Carlos Avendano; "Frequency-domain Source Identification and Manipulation in Stereo Mixes for Enhancement, Suppression and Re-panning Applications;" 2003 IEEE Workshop on Applications of Signal Processing to Audio and Acoustics; Oct. 19-22, 2003; pp. 55-58; New Paltz, NY.

(Continued)

*Primary Examiner* — Ajay Bhatia
*Assistant Examiner* — Haimei Jiang (57) ABSTRACT

A wireless communication device comprises a wireless communication interface, a processing system, and a user interface. The wireless communication interface is configured to wirelessly receive a mixed media signal comprising a plurality of audio streams originating from different source devices. The processing system is configured to isolate the audio streams and generate graphical representations of each one of the audio streams. The user interface is configured to display the graphical representations of each one of the audio streams and receive audio stream modification instructions from a user. The processing system is configured to process the audio stream modification instructions to generate at least one modified audio stream based on the audio stream modification instructions. The user interface is configured to display a graphical representation of the modified audio stream and audibly output a modified mixed media signal comprising the modified audio stream.

20 Claims, 7 Drawing Sheets

(56) References Cited

U.S. PATENT DOCUMENTS

| | | | |
|---|---|---|---|
| 6,067,517 A * | 5/2000 | Bahl et al. | G10L 15/20 704/242 |
| 6,453,022 B1 | 9/2002 | Weinman, Jr. | |
| 6,501,739 B1 | 12/2002 | Cohen | |
| 6,674,842 B2 | 1/2004 | Weinman, Jr. | |
| 7,006,616 B1 | 2/2006 | Christofferson et al. | |
| 7,319,959 B1 * | 1/2008 | Watts | G10L 15/02 704/205 |
| 7,353,169 B1 * | 4/2008 | Goodwin et al. | 704/224 |
| 7,583,956 B2 | 9/2009 | Sammarco | |
| 2002/0150220 A1 * | 10/2002 | Weinman, Jr. | 379/88.13 |
| 2003/0112947 A1 | 6/2003 | Cohen | |
| 2004/0136699 A1 * | 7/2004 | Ross et al. | 386/125 |
| 2005/0068904 A1 | 3/2005 | Wildfeuer et al. | |
| 2006/0109803 A1 | 5/2006 | Takeshima et al. | |
| 2008/0082326 A1 * | 4/2008 | Venkataraman et al. | 704/228 |
| 2008/0096515 A1 | 4/2008 | Kim | |
| 2008/0096553 A1 * | 4/2008 | Saksena et al. | H04W 28/06 455/426.2 |
| 2009/0225970 A1 | 9/2009 | Grigsby et al. | |
| 2010/0015945 A1 | 1/2010 | Shuman et al. | |
| 2010/0132536 A1 * | 6/2010 | O'Dwyer | G10H 1/0008 84/609 |
| 2011/0044474 A1 * | 2/2011 | Grover et al. | 381/107 |
| 2011/0153045 A1 * | 6/2011 | Ryckman et al. | 700/94 |
| 2011/0289410 A1 * | 11/2011 | Paczkowski et al. | G10L 21/06 715/716 |
| 2013/0121511 A1 * | 5/2013 | Smaragdis et al. | 381/119 |

OTHER PUBLICATIONS

Adobe Systems Incorporated; "Adobe Audition 3 User Guide;" XP-002655085; 2007; 294 pages; Adobe Systems Incorporated; San Jose, CA.

* cited by examiner

ISOLATION AND MODIFICATION OF AUDIO STREAMS OF A MIXED SIGNAL IN A WIRELESS COMMUNICATION DEVICE

TECHNICAL BACKGROUND

Wireless communication devices typically utilize wireless communication networks to communicate with further communication networks and equipment. Individuals have become increasingly reliant on wireless communication devices to send and receive information. For example, an individual may utilize a wireless communication device for voice communications, research, business, and entertainment.

A user of a wireless communication device can also use the device to take part in a multi-party communication session. Such sessions may include conference calls, bridged calls, three-way calling, video conferences, or web conferences, for example. In the case of a bridged call, the parties typically utilize a conference bridge. The conference bridge is a specialized type of telephony equipment used to link multiple communication devices to the same conference session. To participate in the conference call, a user calls the bridge using a special access code. The conference bridge then combines the audio streams originating from all connected communication devices and transfers the mixed signal to every device participating in the conference call. In the case of three-way calling, a caller initially calls a first party, and once connected, calls a second party to add the second party to the three-way call. In this manner, the three parties are connected and able to communicate simultaneously. Thus, as with a conference bridge, each party receives a combined signal comprising multiple audio streams originating from the different source devices that are party to the three-way call.

OVERVIEW

A wireless communication device comprises a wireless communication interface, a processing system, and a user interface. The wireless communication interface is configured to wirelessly receive a mixed media signal comprising a plurality of audio streams originating from different source devices. The processing system is configured to isolate the audio streams and generate graphical representations of each one of the audio streams. The user interface is configured to display the graphical representations of each one of the audio streams and receive audio stream modification instructions from a user. The processing system is configured to process the audio stream modification instructions to generate at least one modified audio stream based on the audio stream modification instructions. The user interface is configured to display a graphical representation of the modified audio stream and audibly output a modified mixed media signal comprising the modified audio stream.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
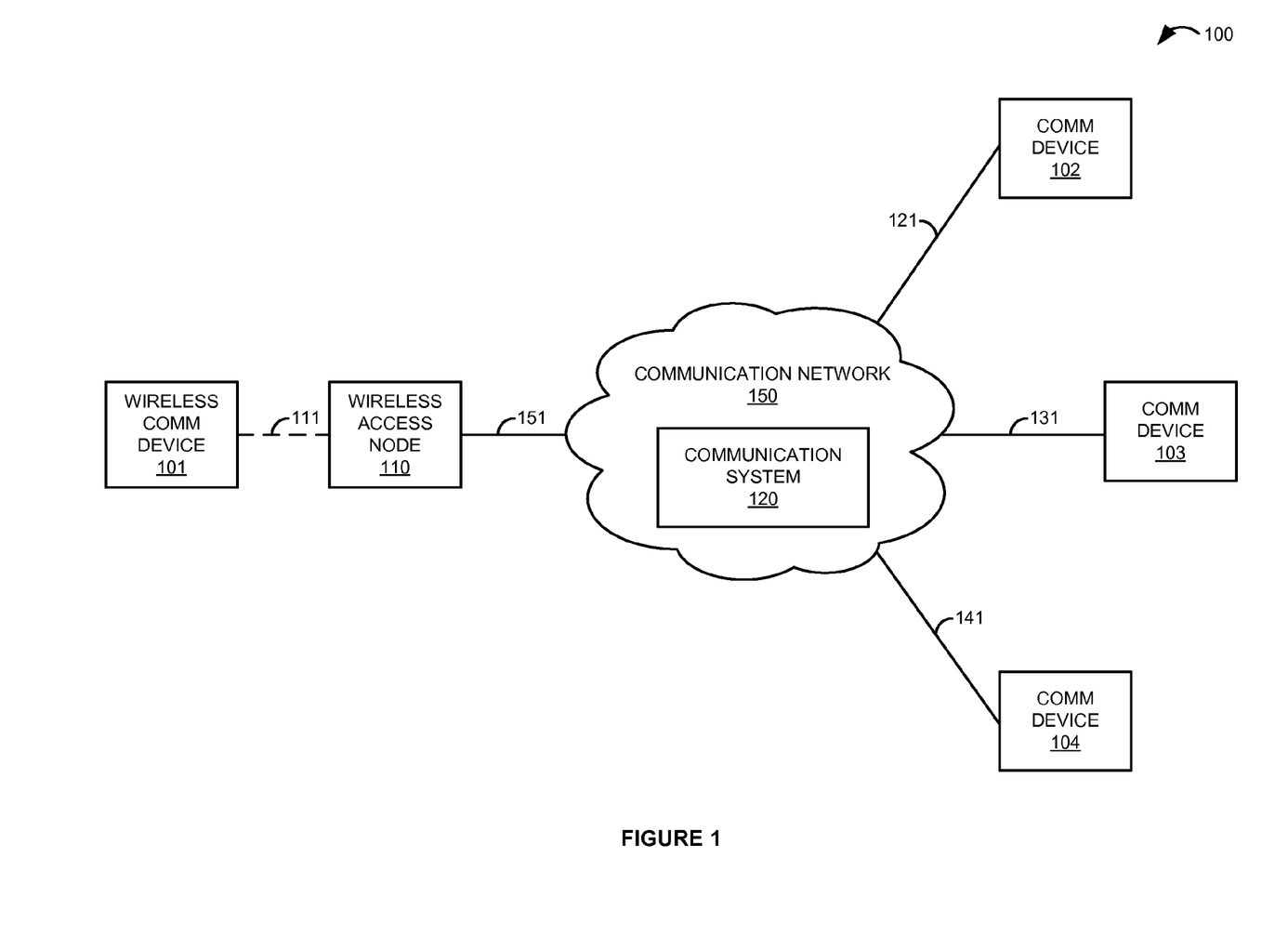
FIG. 1 is a block diagram that illustrates a communication environment.

FIG. 1 is a block diagram that illustrates communication environment 100. Communication environment 100 includes wireless communication device 101, wireless access node 110, communication system 120, communication devices 102, 103, and 104, and communication network 150. Wireless communication device 101 communicates with wireless access node 110 over wireless communication link 111. Wireless access node is in communication with communication network 150 over communication link 151. Communication devices 102, 103, and 104 are in communication with communication network 150 over respective communication links 121, 131, and 141.

Figure 2:
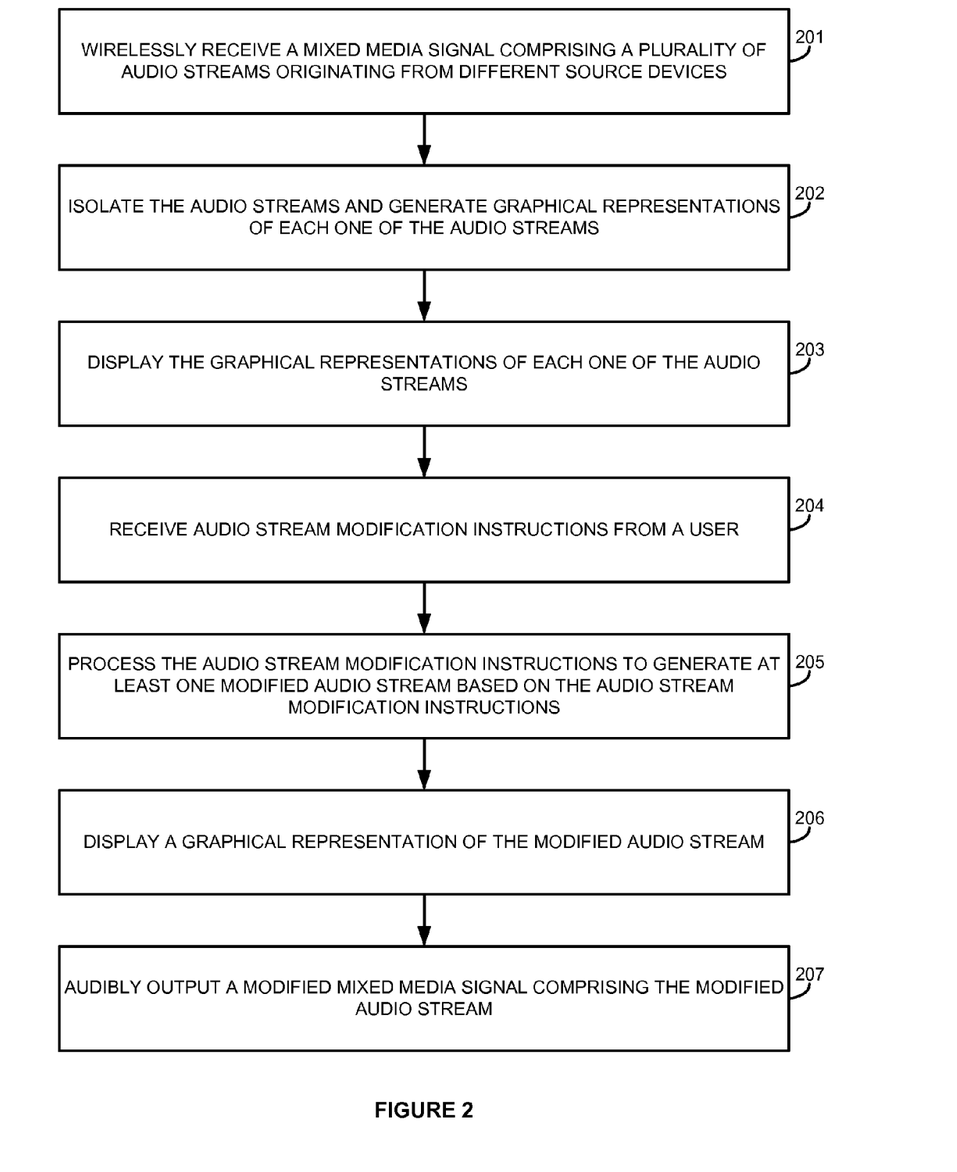
FIG. 2 is a flow diagram that illustrates an operation of a wireless communication device in the communication environment.

FIG. 2 is a flow diagram that illustrates an operation of wireless communication device 101 in communication environment 100. The steps of the operation are indicated below parenthetically. In FIG. 2, wireless communication device 101 wirelessly receives a mixed media signal comprising a plurality of audio streams originating from different source devices 101-104 (201). In some examples, wireless communication device 101 receives the mixed media signal from communication system 120, which could comprise a conference bridge or some other system configured to combine multiple media streams and output a single mixed media signal. Note that the mixed media signal could comprise audio streams, video streams, and other multimedia elements. Typically, the mixed media signal comprises a communication conference session to which the user of wireless communication device 101 is a party, and thus the mixed media signal comprises an audio stream originating from wireless communication device 101 as well as audio streams originating from communication devices 102-104. However, in some examples, the mixed media signal may not comprise an audio stream originating from wireless communication device 101.

Wireless communication device 101 isolates the audio streams and generates graphical representations of each one of the audio streams (202). To isolate the audio streams, wireless communication device could apply digital signal processing (DSP), frequency analysis, speech pattern recognition, and other sound processing techniques to isolate different audio components of the mixed media signal. In some examples, wireless communication device 101 may demultiplex the audio streams from corresponding video streams to isolate the audio streams. Wireless communication device 101 may also isolate the audio streams by identifying each voice of each user of devices 101-104 and separate each voice as a different audio stream. In some examples, wireless communication device could be configured to identify background or ambient noise and isolate the noise as separate audio streams as well.

Once the audio streams are isolated, wireless communication device 101 generates graphical representations of each one of the audio streams (202). Typically, wireless communication device 101 generates the graphical representations by plotting the amplitude of the audio streams over time. However, in some examples, wireless communication device 101 could utilize an acoustic spectrum analyzer to convert the audio streams into acoustic spectrograms, thereby plotting frequencies of the streams over time. Wireless communication device then displays the graphical representations of each one of the isolated audio streams (203).

After displaying the graphical representations, wireless communication device 101 receives audio stream modification instructions from a user (204). The audio stream modification instructions could comprise any instructions from a user of wireless communication device 101 to modify one or more of the audio streams being displayed. For example, the user could direct wireless communication device 101 to increase, decrease, or mute the volume of an audio stream, apply a label, zoom in or out, normalize, equalize, or apply various DSP filters to one or more of the audio streams, such as echo or noise reduction. In some examples, wireless communication device 101 may have ambient noise profiles stored thereon, such as restaurant background chatter, sirens, music, television, computer servers, fans, motors, wind, ocean waves, or road noise, and could apply a noise reduction filter based on an ambient noise profile by identifying ambient noise in an audio stream that matches one of the ambient noise profiles.

Wireless communication device 101 processes the audio stream modification instructions to generate at least one modified audio stream based on the audio stream modification instructions (205). For example, the user may have provided audio stream modification instructions to mute the first audio stream, so wireless communication device 101 would generate the modified audio stream as a muted version of the first audio stream. Wireless communication device 101 then displays a graphical representation of the modified audio stream (206). Typically, wireless communication device 101 would substitute the graphical representation of the modified audio stream for the original audio stream that was used to generate the modified audio stream. Continuing the above example, wireless communication device 101 may display a graphical representation of the muted version of the first audio stream by displaying an audio stream with zero amplitude or by displaying the waveform as a dotted line, for example.

In addition to displaying the graphical representation of the modified audio stream, wireless communication device 101 also audibly outputs a modified mixed media signal comprising the modified audio stream (207). Typically, the modified mixed media signal comprises the original mixed media signal with any modified audio streams substituted for the corresponding original audio streams. For example, if the user has provided audio stream modification instructions to mute the first audio stream, the modified mixed media signal would comprise the original mixed media signal with the first audio stream replaced by the modified audio stream, which is a muted version of the first audio stream.

Advantageously, a user of wireless communication device 101 may provide audio stream modification instructions to modified one or more isolated audio streams of a mixed media input signal. By isolating and displaying the audio streams, the user of wireless communication device 101 can visually identify which of the audio streams correspond to various speakers or background noise. In this manner, the user is then able to modify various aspects of the isolated audio streams. By utilizing the various audio modification options during a real-time multi-party communication session, the user of wireless communication device 101 can continually adjust the audio settings of the various isolated audio streams, thereby enhancing the user's listening experience.

Referring back to FIG. 1, wireless communication device 101 may comprise any device having wireless communication connectivity with hardware and circuitry programmed to function as a telecommunications device, such as Radio Frequency (RF) communication circuitry and an antenna. The RF communication circuitry typically includes an amplifier, filter, modulator, and signal processing circuitry. Wireless communication device 101 may also include a user interface, memory device, software, processing circuitry, or some other communication components. For example, wireless communication device 101 could comprise a telephone, transceiver, mobile phone, cellular phone, smartphone, computer, personal digital assistant (PDA), e-book, game console, mobile Internet device, wireless network interface card, media player, or some other wireless communication apparatus—including combinations thereof. Wireless network protocols that may be utilized by wireless communication device 101 include Code Division Multiple Access (CDMA) 1×RTT, Global System for Mobile communications (GSM), Universal Mobile Telecommunications System (UMTS), High-Speed Packet Access (HSPA), Evolution-Data Optimized (EV-DO), EV-DO rev. A, Third Generation Partnership Project Long Term Evolution (3GPP LTE), Worldwide Interoperability for Microwave Access (WiMAX), IEEE 802.11 protocols (Wi-Fi), Bluetooth, Internet, telephony, or any other wireless network protocol that facilitates communication between wireless communication device 101 and wireless access node 110.

Wireless access node 110 comprises RF communication circuitry and an antenna. The RF communication circuitry typically includes an amplifier, filter, RF modulator, and signal processing circuitry. Wireless access node 110 may also comprise a router, server, memory device, software, processing circuitry, cabling, power supply, network communication interface, structural support, or some other communication apparatus. Wireless access node 110 could comprise a base station, Internet access node, telephony service node, wireless data access point, or some other wireless communication system—including combinations thereof. Some examples of wireless access node 110 include a base transceiver station (BTS), base station controller (BSC), radio base station (RBS), Node B, enhanced Node B (eNode B), and others. Wireless network protocols that may be utilized by wireless access node 110 include CDMA, GSM, UMTS, HSPA, EV-DO, EV-DO rev. A, 3GPP LTE, WiMAX, Wi-Fi, Bluetooth, Internet, telephony, or some other communication format—including combinations thereof.

Communication devices 102, 103, and 104 comprise hardware and circuitry programmed to function as telecommunications devices. Communication devices 102-104 may comprise a communication interface, user interface, memory device, software, processing circuitry, or some other communication components. For example, communication devices 102-104 could comprise a telephone, wireless transceiver, mobile phone, cellular phone, smartphone, computer, personal digital assistant (PDA), e-book, game console, mobile Internet device, network interface card, media player, or some communication apparatus—including combinations thereof. In some examples, communication devices 102-104 could comprise wireless communication devices comprising Radio Frequency (RF) communication circuitry and an antenna.

Communication network 150 comprises multiple network elements such as routers, gateways, telecommunication switches, servers, processing systems, or other communication equipment and systems for providing communication and data services. Communication network 150 could comprise wireless communication nodes, telephony switches, Internet routers, network gateways, computer systems, communication links, or some other type of communication equipment—including combinations thereof. Communication network 150 may also comprise optical networks, asynchronous transfer mode (ATM) networks, packet networks, local area networks (LAN), metropolitan area networks (MAN), wide area networks (WAN), or other network topologies, equipment, or systems—including combinations thereof. Communication network 150 may be configured to communicate over metallic, wireless, or optical links. Communication network 150 may be configured to use time-division multiplexing (TDM), Internet Protocol (IP), Ethernet, optical networking, wireless protocols, communication signaling, or some other communication format—including combinations thereof. In some examples, communication network 150 includes further access nodes and associated equipment for providing communication services to many wireless communication devices across a large geographic region.

Communication system 120 comprises a computer system and communication interface. Communication system 120 may also include other components such a router, server, data storage system, and power supply. Communication system 120 may reside in a single device or may be distributed across multiple devices. Communication system 120 may be a discrete system or may be integrated within other systems, including other systems of communication network 150. Communication system 120 could comprise a conference bridge, mobile switching center, packet gateway, network gateway system, Internet access node, application server, service node, firewall, or some other communication system—including combinations thereof.

Wireless communication link 111 uses the air or space as the transport medium. Wireless communication link 111 may use various protocols, such as CDMA, GSM, UMTS, HSPA, EV-DO, EV-DO rev. A, 3GPP LTE, WiMAX, Wi-Fi, Bluetooth, Internet, telephony, or some other communication format—including combinations thereof. Wireless communication link 111 may comprise many different signals sharing the same link. For example, wireless communication link 111 could include multiple signals operating in a single propagation path comprising multiple communication sessions, frequencies, timeslots, transportation ports, logical transportation links, network sockets, IP sockets, packets, or communication directions—including combinations thereof.

Communication links 121, 131, 141, and 151 use metal, air, space, optical fiber such as glass or plastic, or some other material as the transport media—including combinations thereof. Communication links 121, 131, 141, and 151 could use various communication protocols, such as TDM, IP, Ethernet, telephony, optical networking, hybrid fiber coax (HFC), communication signaling, wireless protocols, or some other communication format—including combinations thereof. Communication links 121, 131, 141, and 151 may be direct links or could include intermediate networks, systems, or devices.

Figure 3:
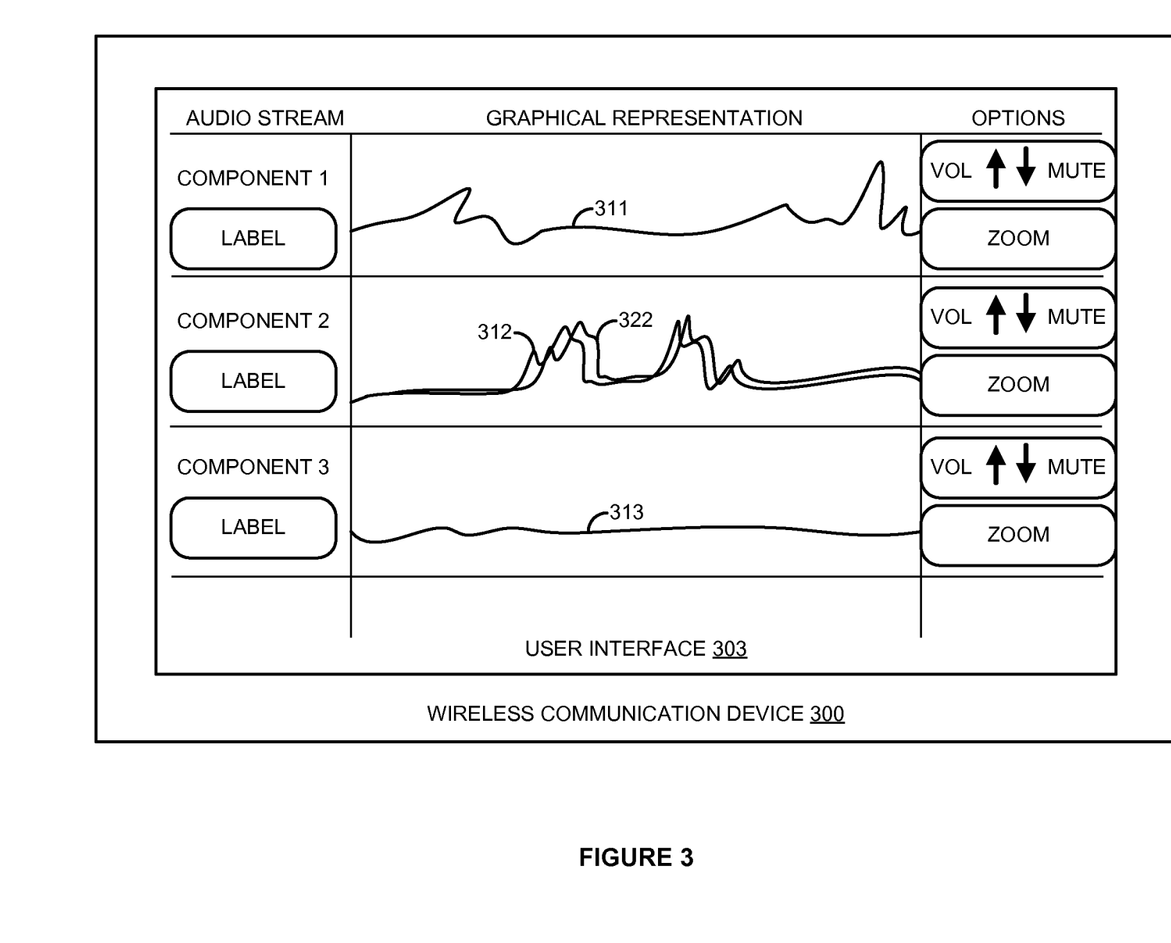
FIG. 3 is a block diagram that illustrates an exemplary display of multiple audio streams on a user interface of a wireless communication device.

FIG. 3 is a block diagram that illustrates an exemplary display of multiple audio streams on user interface 303 of wireless communication device 300. The isolated audio streams displayed on user interface 303 are initially labeled component 1, component 2, and component 3. Graphical representations of each audio stream are then shown, followed by various options. The options displayed on user interface 303 allow a user of wireless communication device 300 to provide audio stream modification instructions. Note that the audio stream modification options presented on user interface 303 are merely exemplary, and greater or fewer options may be available to a user of wireless communication device 300 and could be displayed in different formats.

In FIG. 3, a graphical representation of the 'component 1' audio stream is shown as waveform 311. The 'component 2' audio stream comprises two waveforms, 312 and 322. Waveform 322 is identical to waveform 312 but has a slight delay and slightly greater amplitude than waveform 312. The effect of this delay to the listener is that waveform 322 is echoing waveform 312. Finally, the 'component 3' audio stream is shown as waveform 313. Since there are no peaks in the amplitude of waveform 313 caused by fluctuations in speech patterns, waveform 313 is likely background noise. Waveform 313 could either comprise isolated background noise present in the entire mixed media input signal, or noise associated with a single audio component. In some examples, the noise represented by waveform 313 could comprise ambient noise originating from a communication device of a third speaker who has not spoken during the window of time shown on user interface 303. Also, note that a time scale along the x-axis and an amplitude scale along the y-axis could be shown on the graphical representations, but is not shown herein for clarity.

In the right-hand column, user interface 303 displays options for modifying the associated audio streams. In this example, the user is presented with an option to increase, decrease, or mute the volume of each audio stream. The user may also zoom in to any audio stream by clicking the zoom button. In the case of multiple waveforms displayed in a single graphical representation, such as waveforms 312 and 322 of the 'component 2' audio stream, the user may select one of the waveforms 312 or 322 and then apply one of the options to only the selected waveform. In addition to the options on the right, the user may click the 'label' button to change the label associated with each audio stream component. For example, the user may recognize the voice of the speaker of a particular audio stream and then apply a label to that audio stream to reflect the speaker's name. An example of a display screen after a user has applied various options to the audio streams of FIG. 3 is shown next in FIG. 4.

Figure 4:
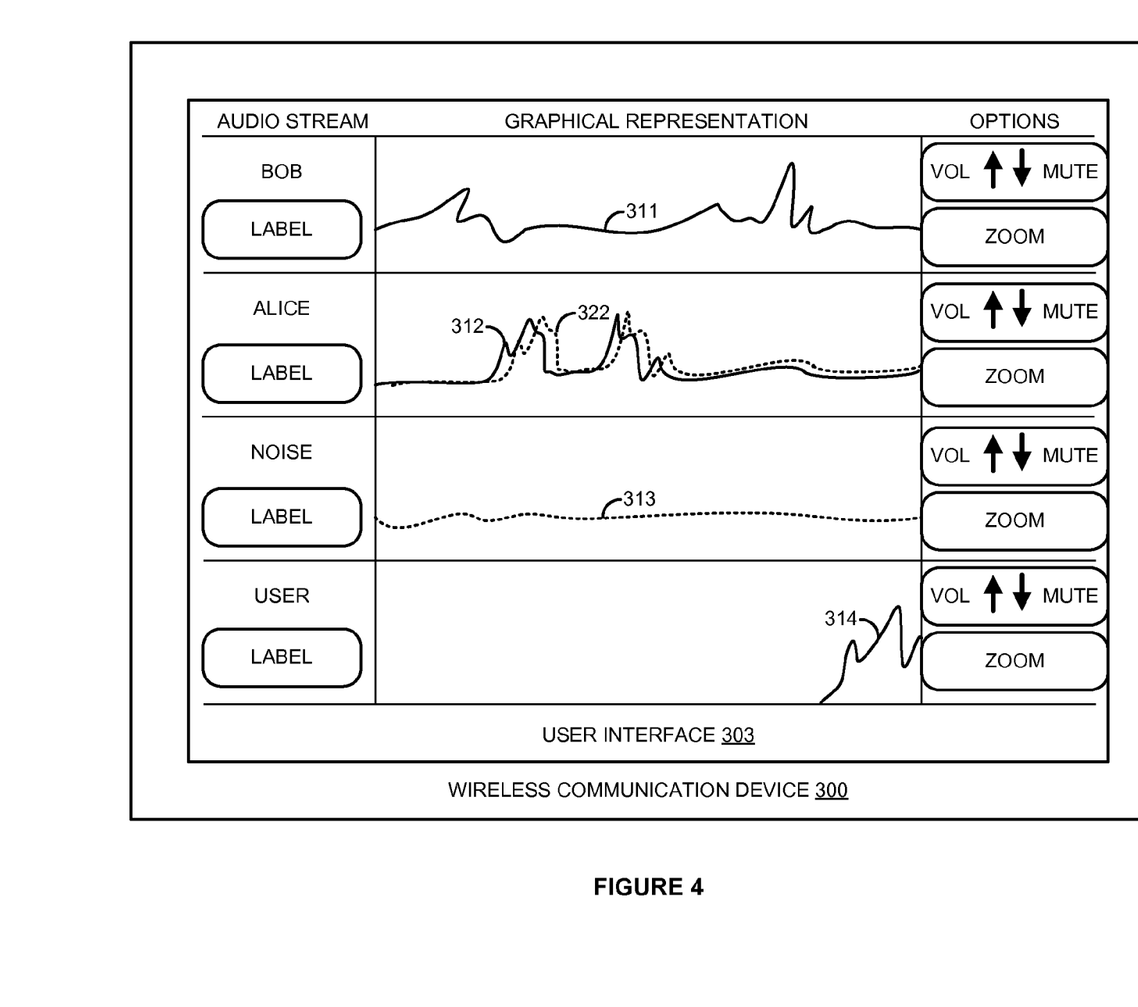
FIG. 4 is a block diagram that illustrates an exemplary display of multiple audio streams on a user interface of a wireless communication device.

FIG. 4 is a block diagram that illustrates an exemplary display of multiple audio streams on user interface 303 of wireless communication device 300. In FIG. 4, user interface 303 provides an example of a display screen after a user has applied various options to the audio streams initially presented in FIG. 3. In addition, a fourth audio stream component has been isolated and labeled 'User' by wireless communication device 300.

As shown in FIG. 4, the user of wireless communication device 300 has applied the label 'Bob' to the first audio stream, 'Alice' to the second audio stream, and 'noise' to the third audio stream. The user may have applied these labels after recognizing the speaking voices of Bob and Alice, respectively. In some examples, wireless communication device 300 may sample portions of the labeled audio streams to use in conjunction with speech recognition techniques to automatically apply or suggest the corresponding label in the future. Likewise, wireless communication device 300 could utilize noise profiles to automatically identify and label the noise audio stream component.

The audio stream labeled 'Alice' comprises waveforms 312 and 322, but waveform 322 is represented by a dotted line. The dotted line indicates to the user of wireless communication device 300 that the corresponding waveform 322 is not being audibly output to the user in the modified mixed media signal that the user is hearing. This may be desirable when the waveform 322 is interfering with the listening experience of the user. For example, Alice may be speaking on a communication device in the same room as the user of wireless communication device 300. Thus, the microphone of Alice's communication device and the microphone of wireless communication device 300 may both be picking up Alice's voice, causing the user of device 300 to hear an echo. To remove the echo caused by waveform 322, the user of device 300 has selected waveform 322 and selected the 'mute' option. In other examples, the user could select a 'remove echo' option or apply an echo cancellation filter to achieve the same effect.

In addition to muting the echo caused by waveform 322, the user of wireless communication device 300 has also muted the 'noise' audio stream 313. Thus, the noise audio stream 313 has changed to a dotted line to indicate that the noise is not being audibly output to the user in the modified mixed media signal heard by the user. In this example, the 'noise' audio stream component represents all the background noise present in the mixed media input signal originating from all the devices contributing to the mixed media signal, and device 300 has isolated this noise and removed it from the voice audio streams. In some examples, wireless communication device 300 may automatically mute or reduce the noise components it detects based on ambient noise profiles or other noise reduction and filtration techniques.

Finally, wireless communication device 300 has detected a new audio stream represented by waveform 314 and automatically labeled the corresponding audio stream component 'User'. In this example, waveform 314 represents the voice of the user of wireless communication device 300. To determine that the fourth audio stream represents the voice of the user, wireless communication device 300 compares the audio received through the microphone of user interface 303 to the newly detected audio stream received in the mixed media signal. In this case, the newly detected audio stream is the audio stream originating from wireless communication device 300. Since the audio received by the microphone of wireless communication device 300 matches the newly detected audio stream, wireless communication device 300 determines that the new stream is the voice of the user of device 300, and automatically labels the new audio stream accordingly.

In addition, any ambient noise or echo effects have also been automatically removed from waveform 314. In a similar manner to detecting the voice of the user, wireless communication device 300 is configured to compare audio received through user interface 303 to the audio stream originating from wireless communication device 300 received in the mixed media signal to determine an ambient noise component and generate the modified audio stream 314 with the ambient noise component removed. In some examples, wireless communication device 300 may automatically detect and mute all audio streams associated with wireless communication device 300 by monitoring the audio streams received through the microphone of user interface 303 and removing the corresponding streams from the mixed media signal to generate the modified mixed media signal heard by the user of device 300.

Figure 5:
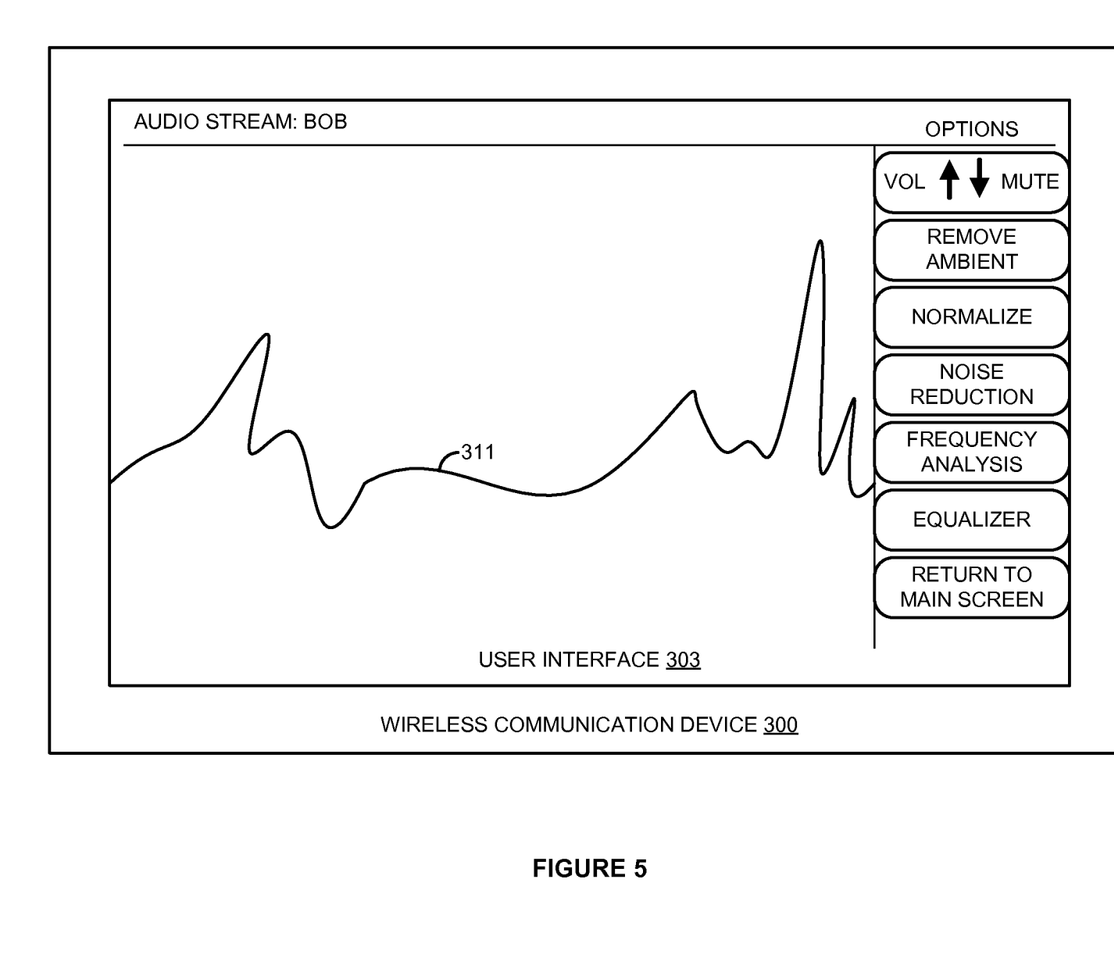
FIG. 5 is a block diagram that illustrates an exemplary display of an audio stream on a user interface of a wireless communication device.

FIG. 5 is a block diagram that illustrates an exemplary display of an audio stream on user interface 303 of wireless communication device 300. In FIG. 5, an enlarged version of the audio stream labeled 'Bob' is displayed on user interface 303 as waveform 311. This enlarged version of the 'Bob' audio stream provides an example of selecting the 'Zoom' option shown on FIGS. 3 and 4 for the audio stream labeled 'Bob'. In addition to the enlarged version of the waveform 311, additional audio stream modification options are presented to the user in the right-hand column.

The 'remove ambient' option enables the user to remove ambient background noise from the audio stream. In some examples, wireless communication device 300 may apply ambient noise profiles when removing ambient noise from the audio stream. The user may also select the 'normalize' option to adjust the amplification of waveform 311. The normalization may be applied relative to a reference amplification value or relative to the amplification of the other audio streams in the mixed media signal. The user may also apply a noise reduction filter with the 'noise reduction' option.

The 'frequency analysis' option allows a user of wireless communication device 300 to view the audio frequency spectrum of waveform 311. For example, wireless communication device 300 may utilize an acoustic spectrum analyzer to convert the sound waves of waveform 311 into an acoustic spectrogram. The acoustic spectrogram generated by the spectrum analyzer provides a time varying acoustic signature of the audio frequencies present in the source waveform 311. In some examples, the acoustic signature of frequencies present in the speech patterns of waveform 311 can be characterized and used by wireless communication device 300 to identify the speaker as Bob. Finally, the user is presented with the 'equalizer' option and an option to 'return to main screen'. An example of a display resulting from the user selecting the 'equalizer' option is provided next in FIG. 6.

Figure 6:
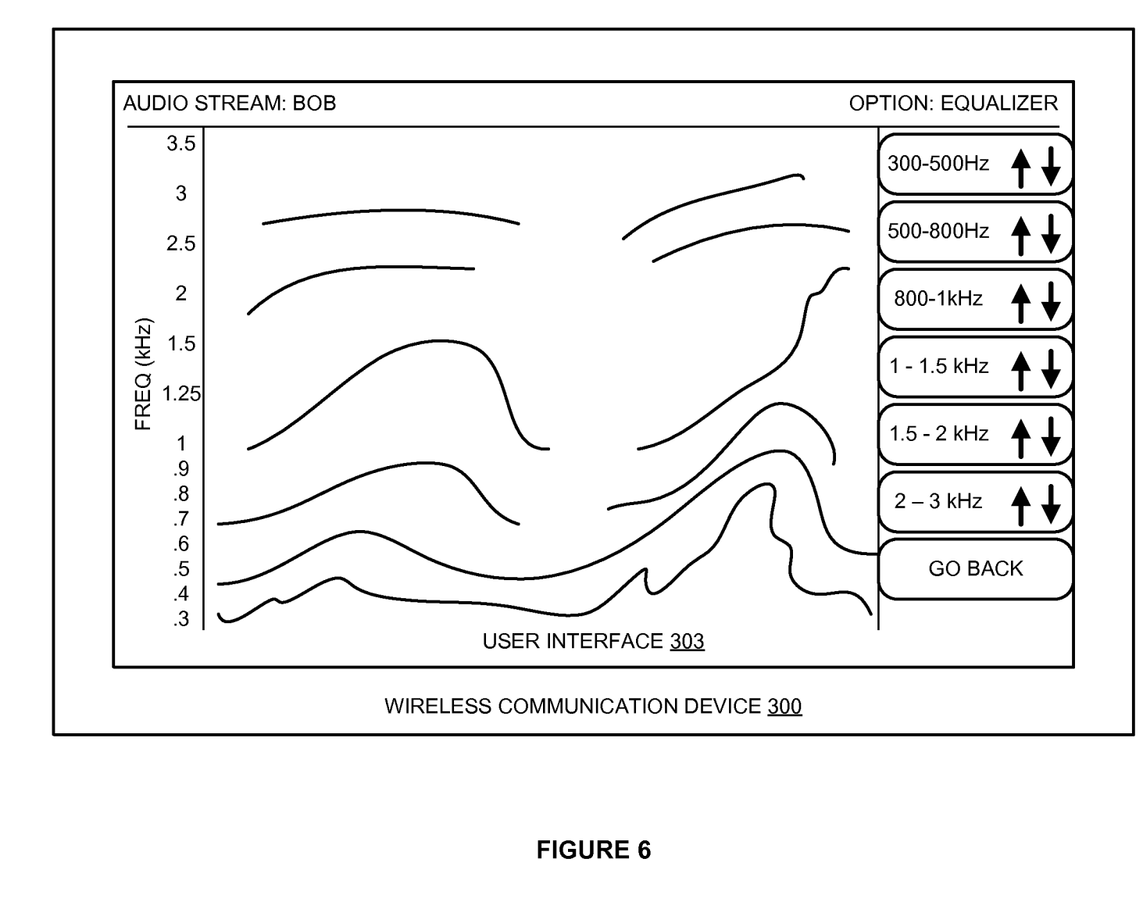
FIG. 6 is a block diagram that illustrates an exemplary display of an audio stream on a user interface of a wireless communication device.

FIG. 6 is a block diagram that illustrates an exemplary display of an audio stream on user interface 303 of wireless communication device 300. In FIG. 6, user interface 303 provides an example of a display screen after a user has selected the 'equalizer' option as shown on FIG. 5. In this example, the graphical representation of the audio stream labeled 'Bob' is presented as a spectrogram to facilitate the user in applying the equalization options shown in the right-hand column. The graphical representation shows the frequency of the sound wave in kilohertz plotted over time.

In order to adjust the equalization of the audio stream, the user can select from the various frequency ranges presented in the equalization options. In this example, each frequency range may be increased or decreased by a predetermined number of decibels by using the corresponding up and down arrows shown in each frequency range. Note that the frequency ranges provided are merely exemplary and greater or fewer levels of granularity could be used. By utilizing the equalization options, the user of wireless communication device 300 can fine-tune the audio properties of the audio stream. When the user has completed adjusting the equalization options, the user can return to the previous display by selecting the 'go back' option.

Figure 7:
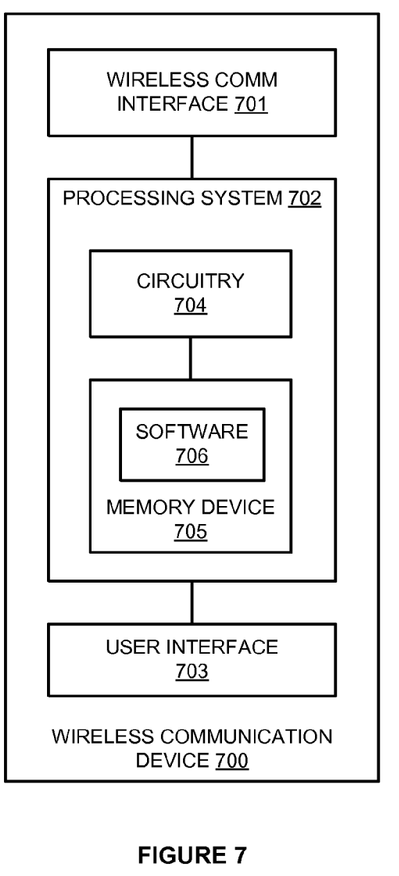
FIG. 7 is a block diagram that illustrates a wireless communication device.

FIG. 7 is a block diagram that illustrates wireless communication device 700. Wireless communication device 700 provides an example of wireless communication devices 101 and 300, although devices 101 and 300 could use alternative configurations. Wireless communication device 700 comprises wireless communication interface 701, processing system 702, and user interface 703. Processing system 702 is linked to wireless communication interface 701 and user interface 703. Processing system 702 includes processing circuitry 704 and memory device 705 that stores operating software 706. Wireless communication device 700 may include other well-known components such as a battery and enclosure that are not shown for clarity. Wireless communication device 700 may comprise a telephone, computer, e-book, mobile Internet appliance, media player, game console, wireless network interface card, or some other wireless communication apparatus—including combinations thereof.

Wireless communication interface 701 comprises RF communication circuitry and an antenna. The RF communication circuitry typically includes an amplifier, filter, RF modulator, and signal processing circuitry. Wireless communication interface 701 may also include a memory device, software, processing circuitry, or some other communication device. Wireless communication interface 701 may use various protocols, such as CDMA, GSM, UMTS, HSPA, EV-DO, EV-DO rev. A, 3GPP LTE, WiMAX, Wi-Fi, Bluetooth, Internet, telephony, or some other wireless communication format. Wireless communication interface 701 may be configured to wirelessly receive a mixed media signal comprising a plurality of audio streams originating from different source devices.

User interface 703 comprises components that interact with a user to receive user inputs and to present media and/or information. User interface 703 may include a speaker, microphone, buttons, lights, display screen, touch screen, touch pad, scroll wheel, communication port, or some other user input/output apparatus—including combinations thereof. User interface 703 may be configured to display graphical representations of each one of the audio streams and receive audio stream modification instructions from a user. Further, user interface 703 may be configured to display a graphical representation of a modified audio stream and audibly output a modified mixed media signal comprising the modified audio stream.

Processing circuitry 704 comprises microprocessor and other circuitry that retrieves and executes operating software 706 from memory device 705. Memory device 705 comprises a disk drive, flash drive, data storage circuitry, or some other memory apparatus. Processing circuitry 704 is typically mounted on a circuit board that may also hold memory device 705 and portions of communication interface 701 and user interface 703. Operating software 706 comprises computer programs, firmware, or some other form of machine-readable processing instructions. Operating software 706 may include an operating system, utilities, drivers, network interfaces, applications, or some other type of software. When executed by processing circuitry 704, operating software 706 directs processing system 702 to operate wireless communication device 700 as described herein for wireless communication devices 101 and 300.

In particular, operating software 706 directs processing system 702 to direct wireless communication interface 701 wirelessly receive a mixed media signal comprising a plurality of audio streams originating from different source devices. Further, operating software 706 directs processing system 702 to isolate the audio streams and generate graphical representations of each one of the audio streams. Operating software 706 directs processing system 702 to direct user interface 703 to display the graphical representations of each one of the audio streams and receive audio stream modification instructions from a user. Operating software 706 directs processing system 702 to process the audio stream modification instructions to generate at least one modified audio stream based on the audio stream modification instructions. Finally, operating software 706 directs processing system 702 to direct user interface 703 to display a graphical representation of the modified audio stream and audibly output a modified mixed media signal comprising the modified audio stream.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication device wherein a wireless access node wirelessly transfers a mixed media signal comprising individual audio streams, the method comprising:
   wirelessly receiving the mixed media signal comprising the individual audio streams from the wireless access node;
   processing the mixed media signal to isolate the individual audio streams from the wirelessly received mixed media signal;
   displaying a first graphical display comprising graphical representations of the individual audio streams;
   modifying one or more of the individual audio streams responsive to a user instruction;
   displaying a second graphical display comprising graphical representations of the modified one or more of the individual audio streams along with un-modified ones of the individual audio streams;
   mixing the modified one or more of the individual audio streams with the un-modified ones of the individual audio streams to generate a modified mixed media signal; and
   outputting the modified mixed media signal.

2. The method of claim 1 wherein isolating the individual audio streams from the mixed media signal comprises analyzing frequencies of the mixed media signal.

3. The method of claim 1 wherein isolating the individual audio streams from the mixed media signal comprises applying speech pattern recognition to the mixed media signal.

4. The method of claim 1 wherein:
   isolating the individual audio streams from the mixed media signal comprises applying speech pattern recognition to the mixed media signal to identify a speaker for one of the individual audio streams; and displaying the first graphical display of the individual audio streams comprises labeling the one of the individual audio streams with a name of the speaker.

5. The method of claim 1 wherein isolating the individual audio streams from the mixed media signal comprises isolating background noise from the mixed media signal as one of the individual audio streams.

6. The method of claim 1 wherein:
isolating the individual audio streams from the mixed media signal comprises isolating background noise from the mixed media signal as one of the individual audio streams; and
modifying the one or more of the individual audio streams responsive to the user instruction comprises modifying a volume of the background noise.

7. The method of claim 1 wherein:
isolating the individual audio streams from the mixed media signal comprises isolating a speaker from the mixed media signal as one of the individual audio streams; and
modifying the one or more of the individual audio streams responsive to the user instruction comprises modifying a volume of the speaker.

8. The method of claim 1 wherein displaying the first graphical display of the individual audio streams comprises operating an acoustic spectrum analyzer to convert the individual audio streams into acoustic spectrograms.

9. The method of claim 1 wherein modifying the one or more of the individual audio streams comprises applying an ambient noise filter to the one or more of the individual audio streams.

10. The method of claim 1 wherein modifying the one or more of the individual audio streams responsive to the user instruction comprises applying an ambient noise filter selected by a user to the one or more of the individual audio streams.

11. A wireless communication device wherein a wireless access node wirelessly transfers a mixed media signal comprising individual audio streams, the wireless communication device comprising:
a wireless communication interface configured to wirelessly receive the mixed media signal comprising the individual audio streams from the wireless access node;
a processing system comprising circuitry configured to process the mixed media signal to isolate the individual audio streams from the wirelessly received mixed media signal;
a user interface configured to display a first graphical display comprising graphical representations of the individual audio streams;
the processing system configured to modify one or more of the individual audio streams responsive to a user instruction;
the user interface configured to display a second graphical display comprising graphical representations of the modified one or more of the individual audio streams along with un-modified ones of the individual audio streams;
the processing system configured to mix the modified one or more of the individual audio streams with the un-modified ones of the individual audio streams to generate a modified mixed media signal; and
the user interface configured to output the modified mixed media signal.

12. The wireless communication device of claim 11 wherein the processing system configured to process the mixed media signal to isolate the individual audio streams from the wirelessly received mixed media signal comprises the processing system configured to analyze frequencies of the mixed media signal.

13. The wireless communication device of claim 11 wherein the processing system configured to process the mixed media signal to isolate the individual audio streams from the mixed media signal comprises the processing system configured to apply speech pattern recognition to the mixed media signal.

14. The wireless communication device of claim 11 wherein:
the processing system configured to process the mixed media signal to isolate the individual audio streams from the mixed media signal comprises the processing system configured to apply speech pattern recognition to the mixed media signal to identify a speaker for one of the individual audio streams; and
the user interface configured to display the first graphical display of the individual audio streams comprises the user interface configured to label the one of the individual audio streams with a name of the speaker.

15. The wireless communication device of 11 wherein the processing system configured to process the mixed media signal to isolate the individual audio streams from the mixed media signal comprises the processing system configured to isolate background noise from the mixed media signal as one of the individual audio streams.

16. The wireless communication device of 11 wherein:
the processing system configured to process the mixed media signal to isolate the individual audio streams from the mixed media signal comprises the processing system configured to isolate background noise from the mixed media signal as one of the individual audio streams; and
the processing system configured to modify the one or more of the individual audio streams responsive to the user instruction comprises the processing system configured to modify a volume of the background noise.

17. The wireless communication device of claim 11 wherein:
the processing system configured to process the mixed media signal to isolate the individual audio streams from the mixed media signal comprises the processing system configured to isolate a speaker from the mixed media signal as one of the individual audio streams; and
the processing system configured to modify the one or more of the individual audio streams responsive to the user instruction comprises the processing system configured to modify a volume of the speaker.

18. The wireless communication device of claim 11 wherein:
the processing system is configured to utilize an acoustic spectrum analyzer to convert the individual audio streams into acoustic spectrograms; and
the user interface configured to display the first graphical display of the individual audio streams comprises the user interface configured to display the acoustic spectrograms.

19. The wireless communication device of claim 11 wherein the processing system configured to modify the one or more of the individual audio streams responsive to the user instruction comprises the processing system configured to apply an ambient noise filter to the one or more of the individual audio streams.

20. The wireless communication device of claim 11 wherein the processing system configured to modify the one or more of the individual audio streams responsive to the user instruction comprises the processing system configured to apply an ambient noise filter selected by a user to the one or more of the individual audio streams.

\* \* \* \* \*